Nov. 4, 1952     A. GORDON     2,616,426
CATAMENIAL TRAP

Filed June 15, 1950

INVENTOR.
Adele Gordon
BY
Rafhur Brown.
ATTORNEY

UNITED STATES PATENT OFFICE 2,616,426

CATAMENIAL TRAP

Adele Gordon, Milwaukee, Wis.

Application June 15, 1950, Serial No. 168,345

3 Claims. (Cl. 128—285)

This invention has to do with feminine hygiene and particularly to catamenial traps for the reception and hygienic disposition of menstrual secretions.

One object of the present invention is to provide a trap for the purpose indicated which may be worn internally without a trace of discomfort, which may be readily self applied and removed without special skill or extensive training, and which may be relied upon to effectively prevent unwanted escape or external traces of the menses.

Other more specific objects and advantages will appear, expressed or implied, from the following description of an exemplary embodiment of the invention.

Figure 1:
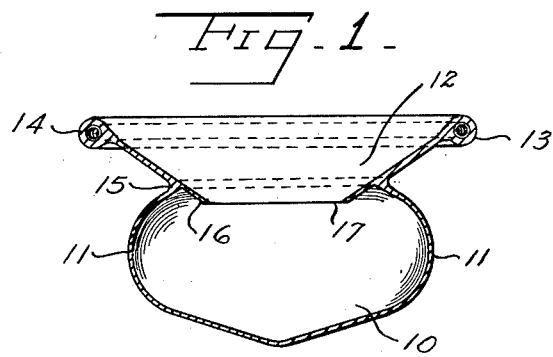
Figure 1 is a view in cross-section of a catamenial trap constructed in accordance with the present invention.

The catamenial trap selected for illustration comprises a substantially circular membranous pouch or cup 10 of rather shallow bulbous form having bulging side walls 11 projecting well beyond the top opening thereof. The cup shown is formed of a thin, highly flexible and pliable, non-absorbent material impervious to moisture, and having smooth readily cleaned surfaces. It has been found that live rubber stock of sufficient thinness is a satisfactory material for this purpose.

The trap shown also includes an outwardly flaring circular membranous apron 12 of like material overlying the cup 10 and integrally joined to and throughout the rim thereof. The apron 12 is preferably of rather shallow frusto-conical form symmetrically disposed with respect to the central axis of the cup 10 and of a diameter preferably greater than that of the cup.

The outer periphery of the apron 12 is thickened to provide a stiffening ring 13 and is preferably equipped with a light coil spring 14 embedded in, completely covered by, and extending throughout the ring. The spring 14 adds desirable stiffness and springiness and also functions to yieldably retain the apron 12 in an expanded or spread condition. A thickened portion 15, formed at the juncture of the apron 12 with the rim of the cup 10, provides a second stiffening ring that cooperates with the outer ring 13 to maintain the apron in a smooth condition free from wrinkles, furrows, or creases that might otherwise impair free drainage of secreted matter thereover.

Provision is made for preventing accidental discharge from the cup 10. For this purpose, a circular lip or dam 16 is provided extending into the cup 10 from the rim thereof. In the trap shown the lip 16 constitutes an inward extension or continuation of the apron 12 and terminates in a narrow feather edge 17, constituting the inner periphery of the apron, over which drainage from the apron passes freely into the cup.

Figure 2:
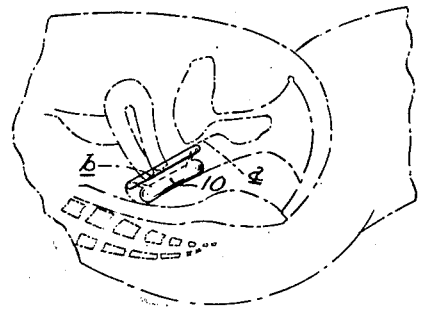
Fig. 2 is a diagrammatic view of the female organs illustrating the applied position of the trap.

The trap is adapted to be worn internally in the position substantially as indicated in Fig. 2 with the outer periphery of the apron 12 seated squarely against the ceiling a of the vaginal tract at the remote end thereof. It will be noted that the diametrical expanse of the apron is sufficient to cover a major portion or at least a large part of the ceiling so that, when positioned as far back as possible, complete coverage of the cervix b is assured, thereby assuring that all discharge therefrom will enter the apron 12 and be directed thereby into the cup 10. The necessity for precise positioning or fitting of the device or any part thereof with respect to or on the cervix is thus avoided, so that effective application thereof requires only a simple manipulation involving merely entering the same into the vaginal tract and advancing it thereinto as far as it will go.

To facilitate entry into the tract the apron 12 is laterally compressed by drawing together diametrically opposite portions of the outer periphery thereof between the thumb and fingers of one hand, actual entry and advance into final position being effected preferably by the same hand. The device is automatically retained in this position by interengagement of the periphery 13 thereof with the natural folds within the vaginal tract.

The device is also as readily withdrawable and is commonly withdrawn, for emptying and cleaning, and replaced each day during a menstrual period. The lip 16 is particularly effective to prevent spilling during withdrawal.

The effectiveness and practicability of the trap hereinabove described has been demonstrated in continued and repeated practical use and the fact that it is worn in perfect comfort has also been repeatedly demonstrated. It has been found that an experienced user becomes unaware of its presence when applied in the manner described.

Various changes may be made in the embodiment of the invention hereinabove specifically described without departing from or sacrificing the advantages of the invention as defined in the appended claims.

I claim:

1. A catamenial trap comprising a membranous cup, an outwardly flaring apron of generally frusto-conical form overlying said cup, said cup having a rim joined to said apron in a zone intermediate the inner and outer peripheries of said apron, the outer periphery of said apron being adapted to seat upon the vaginal ceiling and to encircle a large portion of the ceiling area in the region of the cervix, said apron forming a drain surface adapted to intercept and direct discharge from the cervix into said cup irrespective of the position of said cervix within the encircled area.

2. A catamenial trap, as defined in claim 1, wherein the outer periphery of said apron comprises a relatively thick resilient structure spaced from said cup and providing a seal for the trap.

3. A catamenial trap, as defined in claim 1, wherein the inner portion of said apron comprises a dam for discouraging discharge from said cup.

ADELE GORDON.

REFERENCES CITED

The following references are of record in the file of this patent:

FOREIGN PATENTS

| Number | Country | Date |
|---|---|---|
| 363,976 | France | May 18, 1906 |
| 549,150 | Great Britain | Nov. 9, 1942 |